United States Patent
Peters

(10) Patent No.: US 10,638,591 B2
(45) Date of Patent: Apr. 28, 2020

(54) PLASMA ARC CUTTING SYSTEM, INCLUDING SWIRL RINGS, AND OTHER CONSUMABLES, AND RELATED OPERATIONAL METHODS

(71) Applicant: Hypertherm, Inc., Hanover, NH (US)

(72) Inventor: John Peters, Canaan, NH (US)

(73) Assignee: Hypertherm, Inc., Hanover, NH (US)

(*) Notice: Subject to any disclaimer, the term of this patent is extended or adjusted under 35 U.S.C. 154(b) by 472 days.

(21) Appl. No.: 15/484,187

(22) Filed: Apr. 11, 2017

(65) Prior Publication Data

US 2017/0291244 A1 Oct. 12, 2017

Related U.S. Application Data

(60) Provisional application No. 62/320,935, filed on Apr. 11, 2016.

(51) Int. Cl.
| | |
|---|---|
| *B23K 10/00* | (2006.01) |
| *H05H 1/28* | (2006.01) |
| *H05H 1/34* | (2006.01) |
| *B23K 37/00* | (2006.01) |
| *H05H 1/38* | (2006.01) |

(52) U.S. Cl.
CPC .............. *H05H 1/28* (2013.01); *B23K 10/00* (2013.01); *B23K 10/006* (2013.01); *B23K 37/003* (2013.01); *H05H 1/34* (2013.01); *H05H 1/3405* (2013.01); *H05H 1/38* (2013.01); *H05H 2001/3436* (2013.01); *H05H 2001/3468* (2013.01)

(58) Field of Classification Search
CPC .... B23K 10/00; B23K 10/006; B23K 37/003; H05H 1/28; H05H 1/34; H05H 1/3405; H05H 1/26; H05H 1/38
USPC .............. 219/121.5, 121.51, 121.52, 121.44, 219/121.39, 75, 121.59
See application file for complete search history.

(56) References Cited

U.S. PATENT DOCUMENTS

| | | | | |
|---|---|---|---|---|
| 5,317,126 | A * | 5/1994 | Couch, Jr. ................ | H05H 1/34 219/121.48 |
| 7,375,302 | B2 * | 5/2008 | Twarog ................... | B23K 10/02 219/121.48 |

(Continued)

FOREIGN PATENT DOCUMENTS

| | | |
|---|---|---|
| RU | 7039 U1 | 7/1998 |
| SU | 1694364 A1 | 11/1991 |

(Continued)

*Primary Examiner* — Mark H Paschall
(74) *Attorney, Agent, or Firm* — Proskauer Rose LLP

(57) ABSTRACT

A plasma gas swirl ring for a liquid cooled plasma arc torch is provided. The swirl ring comprises a substantially hollow body having a distal end, a proximal end, an interior region defined by an interior surface, and an exterior surface. The interior region of the body is configured to receive an electrode of the plasma arc torch. The swirl ring comprises a first opening disposed within a portion of the proximal end of the body, a second opening disposed about a central portion of the body, and a third opening comprising at least one swirling port disposed within a portion of the distal end of the body. The third opening is configured to provide a swirling flow of the plasma gas about the electrode at the distal end of the body.

20 Claims, 3 Drawing Sheets

(56) References Cited

U.S. PATENT DOCUMENTS

| | | | |
|---|---|---|---|
| 8,338,740 B2* | 12/2012 | Liebold | H05H 1/28 |
| | | | 219/121.5 |
| 2007/0007256 A1* | 1/2007 | Duan | H05H 1/34 |
| | | | 219/121.5 |
| 2008/0230522 A1 | 9/2008 | Tverskoi et al. | |
| 2010/0078408 A1 | 4/2010 | Liebold et al. | |
| 2012/0248073 A1* | 10/2012 | Conway | H05H 1/28 |
| | | | 219/121.49 |
| 2015/0334818 A1* | 11/2015 | Namburu | H05H 1/34 |
| | | | 219/121.51 |
| 2015/0351214 A1* | 12/2015 | Patel | H05H 1/28 |
| | | | 219/121.49 |

FOREIGN PATENT DOCUMENTS

| | | |
|---|---|---|
| UA | 82584 C2 | 4/2008 |
| WO | 91/16166 A1 | 10/1991 |

* cited by examiner

PLASMA ARC CUTTING SYSTEM, INCLUDING SWIRL RINGS, AND OTHER CONSUMABLES, AND RELATED OPERATIONAL METHODS

CROSS REFERENCE TO RELATED APPLICATION

This application claims the benefit of and priority to U.S. Provisional Patent Application No. 62/320,935, filed Apr. 11, 2016, which is owned by the assignee of the instant application and incorporated herein by reference in its entirety.

TECHNICAL FIELD

The present invention generally relates to the field of plasma arc cutting systems and processes. More specifically, the invention relates to improved consumable components (e.g., swirl rings) and operational methods for controlling a plasma gas flow in a plasma arc torch.

BACKGROUND

Plasma arc torches are widely used for high temperature processing (e.g., heating, cutting, gouging and marking) of materials. A plasma arc torch generally includes a torch head, an electrode mounted within the torch head, an emissive insert disposed within a bore of the electrode, a nozzle with a central exit orifice mounted within the torch head, a shield, electrical connections, passages for cooling, passages for arc control fluids (e.g., plasma gas) and a power supply. A swirl ring can be used to control fluid flow patterns in the plasma chamber formed between the electrode and the nozzle. In some torches, a retaining cap is used to maintain the nozzle and/or swirl ring in the plasma arc torch. In operation, the torch produces a plasma arc, which is a constricted jet of an ionized gas with high temperature and sufficient momentum to assist with removal of molten metal. Gases used in the torch can be non-reactive (e.g., argon or nitrogen), or reactive (e.g., oxygen or air).

There are certain conflicting demands on a plasma arc torch. One is to keep the torch diameter small so that it can easily access a wide variety of shapes, such as an I-beam channel. Another demand is to increase the amount of control and flexibility in the torch design to accommodate different processes. For example, consumable stack-ups for a 300 Amp process, a 130 Amp process and an 80 Amp process may look very different from one another. This may be because the processes need varying amount of copper in the nozzle to accommodate the heat load, such as more copper for higher-current nozzles. Further, a lower-current process may require a radial swirl injection flow whereas a higher-current process may require an axially injected swirl flow. A radial injection swirl has initial velocity components entering the plasma chamber in the tangential and radial directions. In this configuration, the axial flow direction, which is parallel to the cylindrical axis defined by the nozzle bore, is about zero. An axial swirl injection has initial velocity components in the tangential and axial directions. In this configuration, the initial radial component is about zero. In addition to the nature of the initial gas velocity, the location of the gas injection point into the plasma chamber is important and can change substantially from one design stack-up to another. Thus, there is a need for a torch design that can accommodate the varying flow control demands and other complexities for different operating currents, such as providing a single consumable component with flexible features that can accommodate these demands and complexities.

SUMMARY

To accommodate more flexible designs and a wide range of currents while also keeping the diameter of the torch low, the present invention moves some of the flow controls and complexities away from the torch body and into the consumables, such as into the swirl ring. The swirl ring design of the present invention thus permits customized flow patterns for different operating currents.

In one aspect, a plasma gas swirl ring for a liquid cooled plasma arc torch is provided. The swirl ring includes a substantially hollow body having a distal end, a proximal end, an interior region defined by an interior surface, and an exterior surface. The distal and the proximal ends of the body define a longitudinal axis extending therethrough. The interior region of the body is configured to receive an electrode of the plasma arc torch. The swirl ring also includes a first opening disposed within a portion of the proximal end of the body. The first opening is configured to provide fluid communication from the interior region to the exterior surface of the body. The swirl ring additionally includes a second opening disposed about a central portion of the body. The second opening is configured to provide fluid communication from the exterior surface to the interior region of the body. The swirl ring further includes a third opening comprising at least one swirling port disposed within a portion of the distal end of the body. The third opening fluidly connects the interior region of the body to an exterior region and the third opening is configured to provide a swirling flow of the plasma gas about the electrode at the distal end of the body.

In some embodiments, the first opening is oriented substantially perpendicular to the longitudinal axis. In some embodiments, the second opening is oriented substantially perpendicular to the longitudinal axis. The second opening can comprise at least one metering port. In some embodiments, the third opening is oriented substantially parallel to the longitudinal axis.

In some embodiments, at least a portion of the interior surface defines a portion of a swirl gas chamber proximal to and in fluid communication with the third opening. The swirl gas chamber can be further defined by an exterior surface of the electrode. In some embodiments, the second opening comprises an inlet to the swirl gas chamber and the third opening comprises an outlet from the swirl gas chamber.

In some embodiments, the swirl ring further comprises a first sealing member between the interior surface of the swirl ring and an exterior surface of the electrode. The first sealing member is axially located between the first and the second openings. In some embodiments, the swirl ring further comprises a second sealing member between the interior surface of the swirl ring and an exterior surface of the electrode. The second sealing member is axially located between the second and the third openings. In some embodiments, the swirl ring further comprises an annular supply passage near the proximal end of the body. The annular supply passage is defined by the interior surface of the of the swirl ring and an exterior surface of the electrode and configured to conduct a gas flow into the interior region of the swirl ring.

In another aspect, a method for controlling a plasma gas flow through a swirl ring in a plasma arc torch is provided. The swirl ring has a substantially hollow body with a distal end, a proximal end, an interior region defined by an interior surface, and an exterior surface, where the distal and the proximal ends of the swirl ring defines a longitudinal axis extending therethrough. The method includes supplying the plasma gas flow into the interior region of the swirl ring near the proximal end of the body and conducting the plasma gas flow from the interior region to the exterior surface of the swirl ring through a first opening disposed within a portion of the proximal end of the body. The method also includes conducting the plasma gas flow from the exterior surface to a swirl gas chamber in the interior region of the swirl ring through a second opening located in a central portion of the body. The swirl gas chamber is defined by the interior surface of the swirl ring and an exterior surface of an electrode located within the interior region of the swirl ring. The method further includes conducting the plasma gas flow from the swirl gas chamber to an exterior region through a third opening disposed within a portion of the distal end of the body, and imparting, by the third opening, a swirling motion to the plasma gas flow about the electrode at the distal end of the body.

In some embodiments, the method includes conducting the plasma gas flow radially through the first opening in a direction substantially perpendicular to the longitudinal axis. In some embodiments, the method includes conducting the plasma gas flow radially through the second opening in a direction substantially perpendicular to the longitudinal axis. In some embodiments, the method includes conducting the plasma gas flow axially through the third opening in a direction substantially parallel to the longitudinal axis.

In some embodiments, the plasma gas flow is supplied into the interior region of the swirl ring in a generally axial direction parallel to the longitudinal axis. In some embodiments, the method includes metering the plasma gas flow by the second opening.

In some embodiments, the method includes sealing between the interior surface of the swirl ring and an exterior surface of the electrode at an axial location between the first and the second openings. In some embodiments, the method includes sealing between the interior surface of the swirl ring and an exterior surface of the electrode at an axial location between the second and the third openings.

In yet another aspect, a method for controlling a plasma gas flow through a swirl ring in a plasma arc torch is provided. The swirl ring has a substantially hollow body with a distal end, a proximal end, an interior region defined by an interior surface, and an exterior surface. The distal and the proximal ends of the swirl ring define a longitudinal axis extending therethrough. The method includes providing the plasma gas flow axially into the interior region of the swirl ring near the proximal end of the body, and conducting the plasma gas flow radially away from the interior region to the exterior surface of the swirl ring through a first opening disposed within a portion of the proximal end of the body. The method also includes conducting the plasma gas flow radially from the exterior surface to a swirl gas chamber in the interior region of the swirl ring through a second opening located within a central portion of the body. The swirl gas chamber is defined by the interior surface of the swirl ring and an exterior surface of an electrode located within the interior region of the swirl ring. The method additionally includes metering, by the second opening, the plasma gas flow as it travels radially away from the body. The method further includes conducting the plasma gas flow axially from the swirl gas chamber to an exterior region through a third opening disposed within a portion of the distal end of the body and imparting, by the third opening, a swirling motion to the plasma gas flow about the electrode at the distal end of the body.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
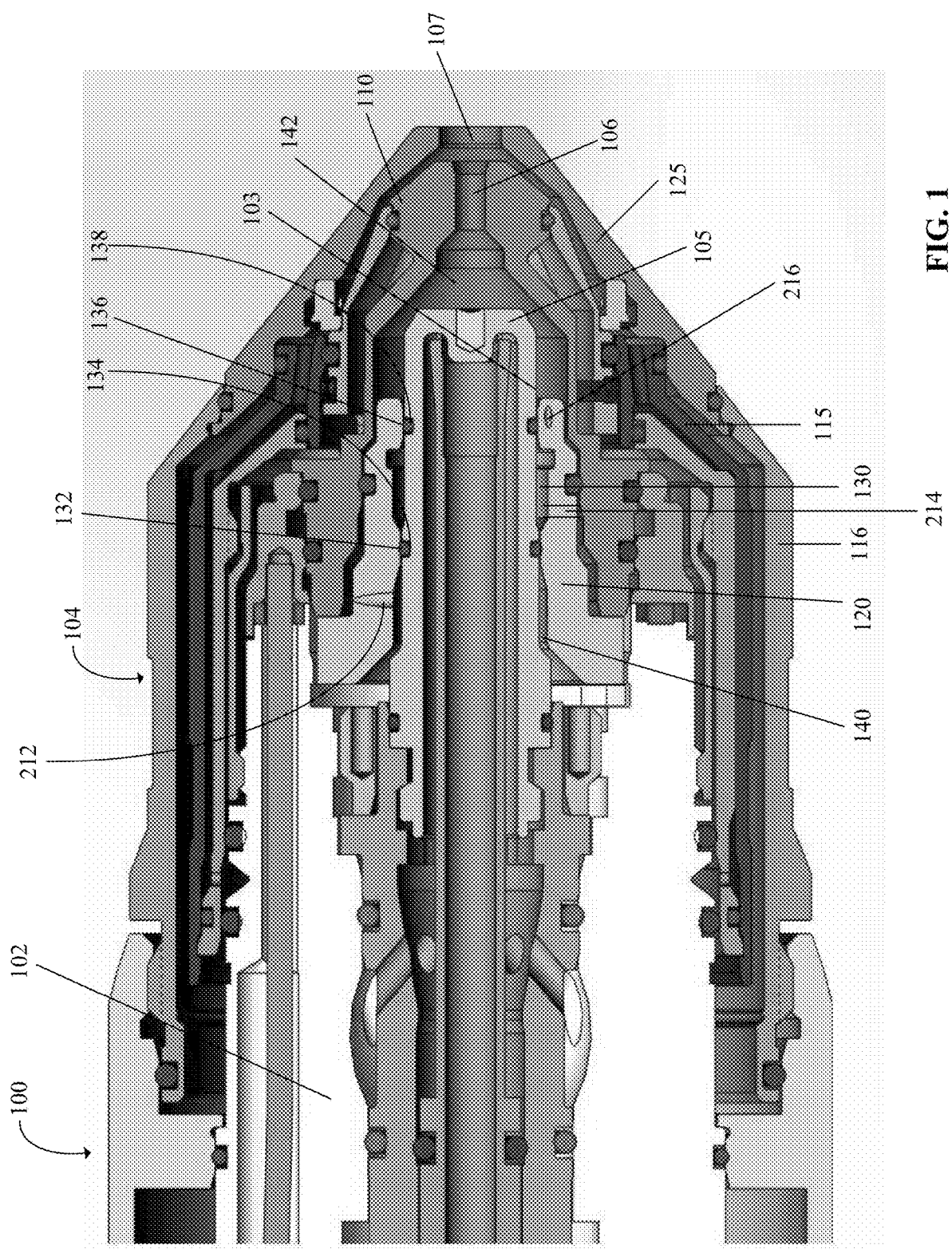
FIG. 1 is a cross-sectional view of a plasma arc torch with a swirl ring, according to an illustrative embodiment of the present invention.

FIG. 1 is a cross-sectional view of a plasma arc torch 100 with a swirl ring 120, according to an illustrative embodiment of the present invention. The plasma arc torch 100 includes a torch body 102 and a torch tip 104 having multiple consumables, for example, an electrode 105, a nozzle 110, an inner retaining cap 115, an outer retaining cap 116, the swirl ring 120, and a shield 125. A plasma chamber 142 is defined, at least in part, by the electrode 105 and the nozzle 110 that situated in a spaced relationship from the electrode 105. The nozzle 110 has a central nozzle exit orifice 106. The swirl ring 120 is mounted around the electrode 105 and configured to impart a tangential velocity component to a plasma gas flow, thereby causing the plasma gas flow to swirl. Details of the swirl ring 120 are described below. The inner retaining cap 115 is securely connected (e.g., threaded) to the torch body 102, which retains the nozzle 110 against the torch body 102 and radially and/or axially position the nozzle 110 with respect to a longitudinal axis of the torch 100. The shield 125, which includes a shield exit orifice 107, is connected to the outer retaining cap 116 that secures the shield 125 to the torch body 102. In some embodiments, the nozzle exit orifice 106 and optionally, the shield exit orifice 107, define a plasma arc exit orifice through which a plasma arc is delivered to a workpiece during torch operation. The torch 100 can additionally include electrical connections, passages for cooling, passages for arc control fluids (e.g., plasma gas), and a power supply. In some embodiments, the plasma arc torch 100 of FIG. 1 is operated at a current of about 300 amperes. In some embodiments, the plasma arc torch 100 is liquid cooled.

Figure 2B:
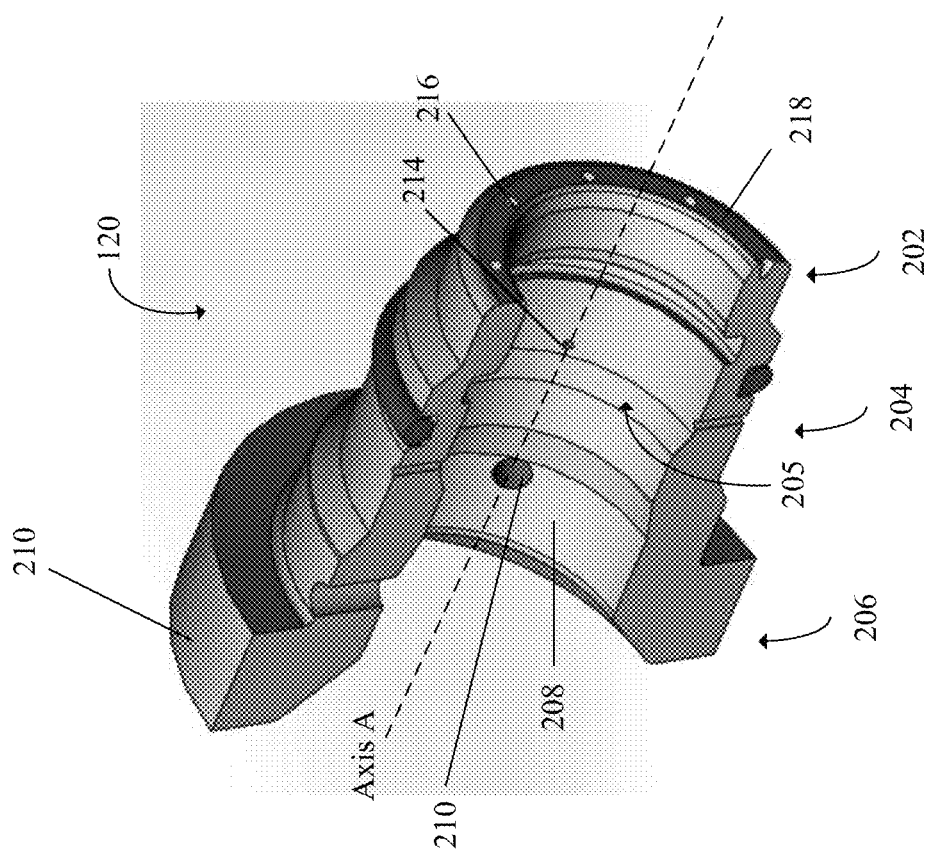
FIGS. 2a and 2b are isometric and sectional views, respectively, of the swirl ring of FIG. 1, according to an illustrative embodiment of the present invention.
Figure 2A:
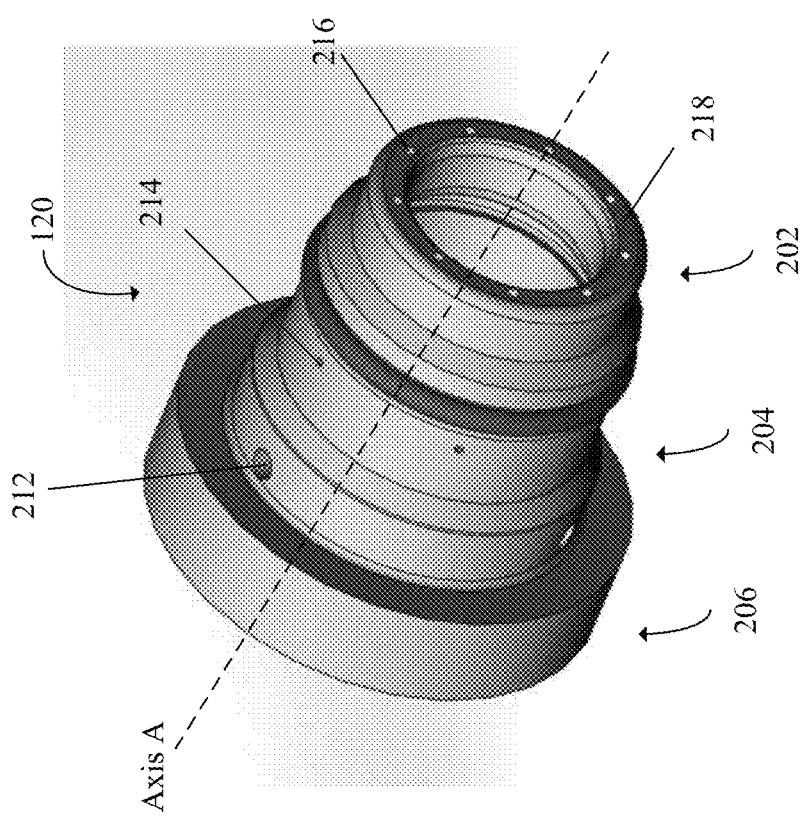

FIGS. 2a and 2b are isometric and sectional views, respectively, of the swirl ring 120 of FIG. 1, according to an illustrative embodiment of the present invention. As shown, the swirl ring 120 has a substantially hollow body defining a longitudinal axis A extending therethrough and includes a distal end/portion 202, a central portion 204, and a proximal end/portion 206 along the longitudinal axis A. The substantially hollow body of the swirl ring 120 also includes an exterior surface 210 and an interior region 205 defined by an interior surface 208 of the swirl ring 120. The interior region 205 is configured to receive the electrode 105 such that swirl ring 120 substantially surrounds at least a portion of an exterior surface 103 of the electrode 105, as shown in FIG. 1.

In some embodiments, a set of one or more first openings 212 is disposed within a portion of the proximal end 206 of the swirl ring 120, where each first opening 212 is configured to fluidly connect the interior region 205 to the exterior surface 210 of the swirl ring 120. For example, each first opening 212 comprises a port that is oriented generally perpendicular to the longitudinal axis A and configured to conduct a plasma gas flow radially outward from the interior region 205 of the swirl ring 120 to the exterior surface 210. The set of one or more first openings 212 can be located around a circumference of the swirl ring body 120 at the proximal end 206 to provide one or more ports for conducting a plasma gas outward to the exterior surface 210 of the swirl ring 120. Each first opening 212 can be configured to permit minimal plasma gas flow restriction at the proximal end 206 of the swirl ring 120. A benefit of the set of first openings 212 is cost reduction. Specifically, drilling holes radially is substantially cheaper in manufacturing time and tooling cost in comparison to drilling smaller metering holes. This is especially true where the first openings 212 do not perform metering functions and they can be manufactured with looser tolerances. Also, because each first opening 212 does not need to have a small internal flange like a metering hole, the wall of the swirl ring 120 in the proximal area 206 can be thicker and thus more robust.

In some embodiments, a set of one or more second openings 214 are disposed about the central portion 204 of the swirl ring 120, such as around a circumference of the swirl ring 120 in the central portion 204. Each second opening 214 is configured to provide fluid communication from the exterior surface 210 to the interior region 205 of the swirl ring body. For example, each second opening 214 comprises a port that is oriented generally perpendicular to the longitudinal axis A and configured to conduct a plasma gas flow radially inward from the exterior surface 210 of the swirl ring 120 to the interior region 205. In some embodiments, each of the second openings 214 is a metering port configured to meter the amount of plasma gas allowed into the interior region 205 of the swirl ring 120.

In some embodiments, a set of one or more third openings 216 are disposed within a portion of the distal end 202 of the swirl ring 120. For example, the one or more third openings 216 are located on an end face 218 of the distal end 202. Each opening 216 comprises a port that is oriented generally parallel to the longitudinal axis A and configured to conduct a plasma gas flow axially outward from the interior region 205 of the swirl ring 120 to an exterior region. In some embodiments, each of the third openings 216 is a swirling port configured to provide a swirling flow of the plasma gas about the electrode 105 at the distal end 202 of the swirl ring body. For example, each of the swirling port is angled to impart a swirling motion to the plasma gas flow therethrough.

In some embodiments, a swirl gas chamber 130, as shown in FIG. 1, is defined by a portion of the interior surface 208 of the swirl ring 120 and a portion of the exterior surface 103 of the electrode 105. The swirl gas chamber 130 can be located centrally within the interior region 205 of the swirl ring 120. In some embodiments, the swirl gas chamber 130 is in fluid communication with the set of third openings 216, such that an outlet of the swirl gas chamber 130 forms a part of a third opening 216. The third openings 216 can be positioned at a distal end of the swirl gas chamber 130. In some embodiments, the swirl gas chamber 130 is in fluid communication with the set of second openings 214, such that an inlet of the swirl gas chamber 130 forms a part of a second opening 214.

In some embodiments, the swirl gas chamber 130 functions as a gas capacitor that provides a buffer between the gas supply into the swirl ring 120 and the gas flow out of the set of third openings 216 to ensure a relatively constant pressure of gas through the third openings 216 for the purpose of gas flow control. In some embodiments, the swirl gas chamber 130 is configured to ramp down the plasma gas after the gas supply is turned off. For example, when the gas supply into the swirl ring 120 is turned off at the end of a cut, there is a volume of gas captured within the swirl gas chamber 130 that bleeds out of the third openings 216, thereby providing a gas flow ramp down that prolongs electrode life. Similar concepts are described in U.S. Pat. Nos. 5,317,126, 8,338,740 and 8,809,728, all assigned to Hypertherm, Inc. of Hanover, N.H., the disclosures of which are incorporated herein by reference in their entireties.

In some embodiments, the set of second openings 214 is designed to ensure that the volume and pressure of the gas inside the swirl gas chamber 130 remains relatively constant. Specifically, by maintaining a higher gas flow external to the swirl ring 120 upstream from (i.e., proximal to) the second openings 214, the pressure drop across the second openings 214 can ensure that there is a substantially constant pressure inside the swirl gas chamber 130. This in turn ensures a smooth gas flow out of the set of third openings 216. Thus, in some embodiments, the flow area through the second openings 214 is larger than the flow area out of the third openings 216. This establishes sufficient pressure inside the swirl gas chamber 130 in comparison to the plasma chamber 142 such that the gas flow through the swirl ring 120 would not be disrupted if the third openings 216 demand more air than is available in the swirl gas chamber 130. In some examples, the ratio of the third openings 216 to the second openings 214 is about 2.3:1. This ratio can have a minimum value of about 2:1. Because the third openings 216 are also configured to impart the desired tangential velocity to the gas therethrough, there may be limits on how large this ratio can be.

Likewise, the flow area through the first openings 212 is larger than the flow area through the second openings 214. For example, the ratio of the flow areas of the first openings 212 to the second openings 214 is approximately 6:1. This ratio can have a minimum value of 2:1. In general, a large ratio is desired so that plasma gas flow is controlled substantially by the second openings 214.

In some embodiments, the set of second openings 214 are configured to control the flow rate through the plasma chamber 142. With a known, controlled pressure upstream of (i.e., proximal to) the second openings 214, a known and consistent mass flow of plasma gas can be directed through the plasma chamber 142. The location of the second openings 214 around the central portion 204 of the swirl ring 120 is also advantageous because it is close to the plasma chamber 214. This minimizes the opportunity for other features to restrict or impact the flow rate. This location also allows for the creation of the swirl gas chamber 130 between the second openings 214 and the third openings 216 to ensure that there is an azimuthal distribution of the plasma gas, and therefore a uniform, smooth flow through the third openings 216.

In some embodiments, one or more sealing members are disposed in the interior region 205 of the swirl ring 120 to form one or more fluid-tight seals between the swirl ring 120 and the electrode 105. For example, a first sealing member 132 is adapted to be housed in a groove 134 on the exterior surface 103 of the electrode 105, where the groove 134 is axially located between the first and the second openings 212, 214 of the swirl ring 120. A second sealing member 136 is adapted to be housed in another groove 138 on the exterior surface 103 of the electrode 105, where the groove 138 is axially located between the second and the third openings 214, 216 of the swirl ring 120. The first and/or the second sealing members 132, 136 may be elastomeric, such as an O-ring. As illustrated, the first sealing member 132 is proximal to the swirl gas chamber 130 and the second sealing member 136 is distal to the swirl gas chamber 130. Surface-to-surface contact between the electrode 105 and the swirl ring 120 near these regions is adapted to deform the sealing members 132, 136 to provide a fluid-tight seal to the swirl gas chamber 130.

In some embodiments, an annular supply channel 140 maintains fluid communication with the interior region 205 of the swirl ring 120 at the proximal end 206. The annular supply channel 140 is defined at least in part by a portion of the interior surface 208 of the swirl ring 120 and a portion of the exterior surface 130 of the electrode 105. The annular supply channel 140 is configured to supply a plasma gas flow to the interior region of the swirl ring 120.

In some embodiments, scallops or another feature (not shown) is located at the physical interface between the exterior surface 210 of the swirl ring 120 and the interior surface of the nozzle 110. Such a feature is configured to allow the plasma gas flow to bypass the annular supply channel 140 and the set of first openings 212, while still permitting minimal flow restriction proximal to the set of second openings 214, thereby ensuring that the volume and pressure of the gas inside the swirl gas chamber 130 remains relatively constant.

Figure 3:
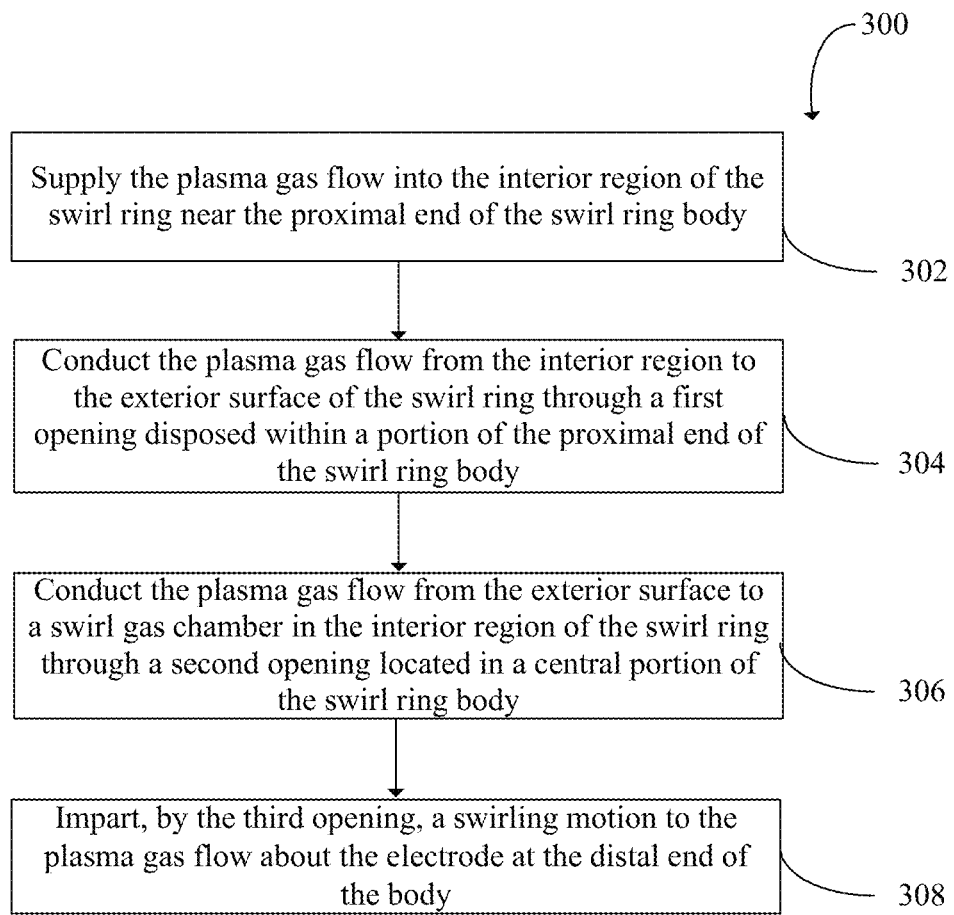
FIG. 3 is a diagram illustrating a process for controlling a plasma gas flow through the swirl ring of FIG. 1, according to an illustrative embodiment of the present invention.

FIG. 3 is a diagram illustrating a process 300 for controlling a plasma gas flow through the swirl ring 120 of the plasma arc torch 100 of FIG. 1, according to an illustrative embodiment of the present invention. During torch operation, a plasma gas flow is introduced to the torch 100 (e.g., from the proximal end of the torch body 102) and travels axially in a distal direction into the interior region 205 of the swirl ring 102 (step 302). For example, the plasma gas flow can enter the interior region 205 of the swirl ring 102 from the gas supply channel 140 that is in fluid communication with the interior region 205. As the plasma gas flows distally through the interior region 205, at least a portion of the plasma gas flow is conducted away from the swirl ring 120 by the first opening 212 located at the proximal end 206 of the swirl ring 120. In some embodiments, the first opening 212 is configured to conduct the plasma gas flow in a radial direction (i.e., generally perpendicular to the longitudinal axis A) from the interior region 205 to the exterior surface 210 of the swirl ring 120 (step 304).

The plasma gas flow exterior to the swirl ring 120 can be conducted into the interior region 205 of the swirl ring 120 through one or more second openings 214 disposed in the central portion 204 of the swirl ring body (step 306). Specifically, each second opening 214 is adapted to conduct the plasma gas flow radially into the swirl gas chamber 130 in the interior region 205 from the exterior surface 210 of the swirl ring 120. In some embodiments, the second opening 214 is metered. In some embodiments, sealing is formed between the interior surface 208 of the swirl ring 120 and the exterior surface 130 of the electrode 105 at one or more locations to provide a fluid-tight seal to the swirl gas chamber 130. For example, sealing can be providing by the first sealing member 132 between the first and the second openings 212, 214. Sealing can also be provided by the second sealing member 136 between the second and the third openings 214, 216.

As the plasma gas flow continues distally through the swirl gas chamber 130, at least a portion of the plasma gas flow is conducted distally out of the swirl gas chamber 130 by one or more third openings 216 disposed in the end face 218 at the distal end 202 of the swirl ring 120. In some embodiments, each of the third openings 216 is configured to provide a swirling, axial gas flow (i.e., generally parallel to the longitudinal axis A) about the electrode 105 (step 608).

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A plasma gas swirl ring for a liquid cooled plasma arc torch, the swirl ring comprising:
    a substantially hollow body having a distal end, a proximal end, an interior region defined by an interior surface, and an exterior surface, the distal and the proximal ends of the body defining a longitudinal axis extending therethrough, wherein the interior region of the body is configured to receive an electrode of the plasma arc torch;
    a first opening disposed within a portion of the proximal end of the body, the first opening configured to provide fluid communication from the interior region to the exterior surface of the body;
    a second opening disposed about a central portion of the body, the second opening configured to provide fluid communication from the exterior surface to the interior region of the body; and
    a third opening comprising at least one swirling port disposed within a portion of the distal end of the body, the third opening oriented substantially parallel to the longitudinal axis, the third opening fluidly connecting the interior region of the body to an exterior region, the third opening configured to provide a swirling flow of the plasma gas about the electrode at the distal end of the body.

2. The swirl ring of claim 1, wherein the first opening is oriented substantially perpendicular to the longitudinal axis.

3. The swirl ring of claim 1, wherein the second opening is oriented substantially perpendicular to the longitudinal axis.

4. The swirl ring of claim 1, wherein at least a portion of the interior surface defines a portion of a swirl gas chamber proximal to and in fluid communication with the third opening.

5. The swirl ring of claim 4, wherein the swirl gas chamber is further defined by an exterior surface of the electrode.

6. The swirl ring of claim 5, wherein the second opening comprises an inlet to the swirl gas chamber.

7. The swirl ring of claim 5, wherein the third opening comprises an outlet from the swirl gas chamber.

8. The swirl ring of claim 1, further comprising a first sealing member between the interior surface of the swirl ring and an exterior surface of the electrode, the first sealing member axially located between the first and the second openings.

9. The swirl ring of claim 1, further comprising a second sealing member between the interior surface of the swirl ring and an exterior surface of the electrode, the second sealing member axially located between the second and the third openings.

10. The swirl ring of claim 1, further comprising an annular supply passage near the proximal end of the body, the annular supply passage defined by the interior surface of the of the swirl ring and an exterior surface of the electrode and configured to conduct a gas flow into the interior region of the swirl ring.

11. The swirl ring of claim 1, wherein the second opening comprises at least one metering port.

12. A method for controlling a plasma gas flow through a swirl ring in a plasma arc torch, the swirl ring having a substantially hollow body with a distal end, a proximal end, an interior region defined by an interior surface, and an exterior surface, the distal and the proximal ends of the swirl ring defining a longitudinal axis extending therethrough, the method comprising:
   supplying the plasma gas flow into the interior region of the swirl ring near the proximal end of the body;
   conducting the plasma gas flow from the interior region to the exterior surface of the swirl ring through a first opening disposed within a portion of the proximal end of the body;
   conducting the plasma gas flow from the exterior surface to a swirl gas chamber in the interior region of the swirl ring through a second opening located in a central portion of the body, wherein the swirl gas chamber is defined by the interior surface of the swirl ring and an exterior surface of an electrode located within the interior region of the swirl ring;
   conducting the plasma gas flow from the swirl gas chamber to an exterior region through a third opening disposed within a portion of the distal end of the body; and
   imparting, by the third opening, a swirling motion to the plasma gas flow about the electrode at the distal end of the body.

13. The method of claim 12, further comprising metering the plasma gas flow by the second opening.

14. The method of claim 12, further comprising conducting the plasma gas flow radially through the first opening in a direction substantially perpendicular to the longitudinal axis.

15. The method of claim 12, further comprising conducting the plasma gas flow radially through the second opening in a direction substantially perpendicular to the longitudinal axis.

16. The method of claim 12, further comprising conducting the plasma gas flow axially through the third opening in a direction substantially parallel to the longitudinal axis.

17. The method of claim 12, wherein the plasma gas flow is supplied into the interior region of the swirl ring in a generally axial direction parallel to the longitudinal axis.

18. The method of claim 12, further comprising sealing between the interior surface of the swirl ring and an exterior surface of the electrode at an axial location between the first and the second openings.

19. The swirl ring of claim 12, further comprising sealing between the interior surface of the swirl ring and an exterior surface of the electrode at an axial location between the second and the third openings.

20. A method for controlling a plasma gas flow through a swirl ring in a plasma arc torch, the swirl ring having a substantially hollow body with a distal end, a proximal end, an interior region defined by an interior surface, and an exterior surface, the distal and the proximal ends of the swirl ring defining a longitudinal axis extending therethrough, the method comprising:
   providing the plasma gas flow axially into the interior region of the swirl ring near the proximal end of the body;
   conducting the plasma gas flow radially away from the interior region to the exterior surface of the swirl ring through a first opening disposed within a portion of the proximal end of the body;
   conducting the plasma gas flow radially from the exterior surface to a swirl gas chamber in the interior region of the swirl ring through a second opening located within a central portion of the body, wherein the swirl gas chamber is defined by the interior surface of the swirl ring and an exterior surface of an electrode located within the interior region of the swirl ring;
   metering, by the second opening, the plasma gas flow as it travels radially away from the body;
   conducting the plasma gas flow axially from the swirl gas chamber to an exterior region through a third opening disposed within a portion of the distal end of the body; and
   imparting, by the third opening, a swirling motion to the plasma gas flow about the electrode at the distal end of the body.

* * * * *